United States Patent [19]

McKechnie

[11] 4,158,258

[45] Jun. 19, 1979

[54] ELEVATION SAMPLING TERRAIN PROBE

[75] Inventor: John C. McKechnie, Maitland, Fla.

[73] Assignee: The United States of America as represented by the Secretary of the Navy, Washington, D.C.

[21] Appl. No.: 899,194

[22] Filed: Apr. 24, 1978

[51] Int. Cl.² ............................ G01B 7/34; G01B 7/28
[52] U.S. Cl. .................................................... 33/174 P
[58] Field of Search ........... 33/174 P, 174 L, 174 PA, 33/174 R; 73/105, 146 R

[56] References Cited
U.S. PATENT DOCUMENTS

| 3,056,209 | 10/1962 | Oliver | 33/174 L |
| 3,470,739 | 10/1969 | Takafuji et al. | 33/174 P |

Primary Examiner—Harry N. Haroian
Attorney, Agent, or Firm—Richard S. Sciascia; Don D. Doty

[57] ABSTRACT

A surface contour sampling system is disclosed which intermittently measures the elevational irregularities in various and sundry surfaces, including those of the earth's terrain, model boards, and the like, with respect to a predetermined datum plane. A unique rotating bell crank and stepping surface sensing sampler combination permits the stepping upon and/or over large sloping or elevational changes by said surface sensing sampler, including those that are normal to the surface trend at any given location, without being stopped thereby, as it is moved forward along a predetermined path thereon by a suitable carrier vehicle.

25 Claims, 6 Drawing Figures

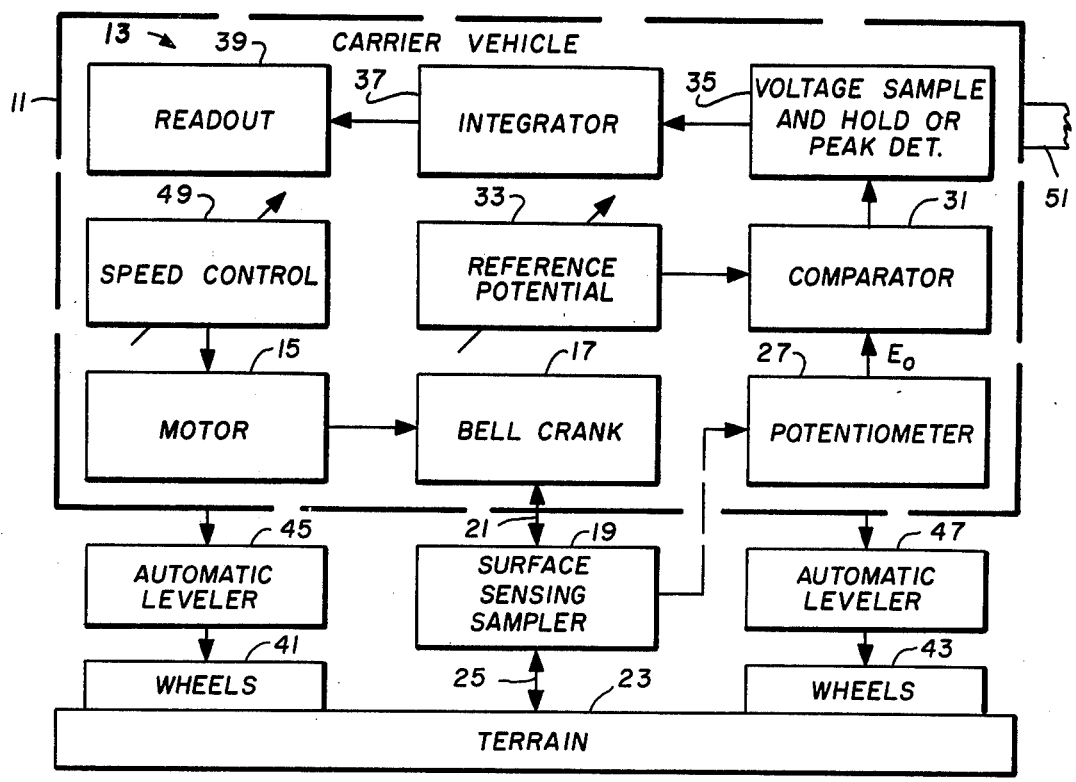
FIG. 1
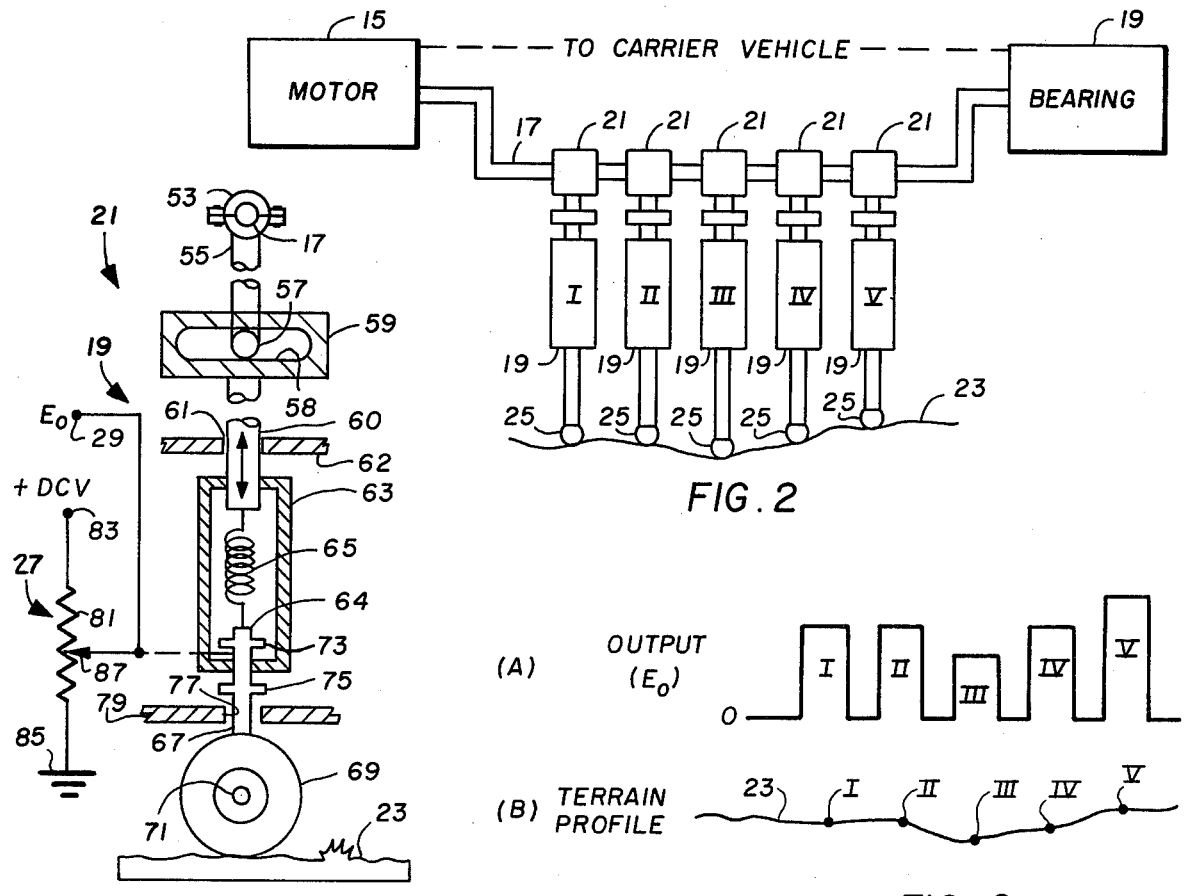
FIG. 2
FIG. 3
FIG. 6

ELEVATION SAMPLING TERRAIN PROBE

FIELD OF THE INVENTION

The present invention, in general, relates to measuring instruments and, in particular, pertains to an improved method and means for continuously measuring the elevation along a given path on a predetermined surface. In even greater particularity, the subject invention comprises a step sampling terrain probe that intermittently but rapidly samples, effectively indicates, or records the elevations or gradients along a given path, either actually on the earth's surface, on the surface of a model board, or on any other suitable surface relative to a predetermined datum, even though some of said elevations or gradients may include rises that are substantially perpendicular to the direction of travel during the sampling process.

DESCRIPTION OF THE PRIOR ART

Heretofore, surface roughness measurements have been made in numerous ways, including by sight, by feel, and by surveying methods. Also, various and sundry gages have been used for such purpose, some of which are quite sophisticated in structure and performance.

Insofar as it is known, the prior art coming the closest to the instant invention is disclosed in U.S. Pat. No. 3,470,739 to Hideo Takafuji et al for Apparatus for Measuring the Shape of a Sheet or Strip, issued Oct. 7, 1969. As disclosed therein, the devices of Takafuji et al constitute apparatus for measuring the shapes of sheet-like members, and they have at least one sensing means movable along the sheet-like member to be measured for sensing the gradient of the sheet relative to a datum at intervals. The sensing means produces a signal which is a function of the gradient, and an integrating means is combined therewith for integrating said gradient signal, so as to obtain the waviness of said sheet-like member in terms of a certain mathematical expression. Because the device of Takafuji et al appears to be primarily directed to the measuring of surface waves or deviations on rolled metal or strip, it ostensively works quite well for such purpose, particularly since such deviations are relatively small and, thus, do not present insurmountable obstacles over which the wheels or other sensor portions thereof cannot pass. Accordingly, it seems to achieve its objectives in a very satisfactory manner, even though it would appear to be severely disadvantaged if the gradients of the surface being measured increased abruptly and to a considerable extent.

SUMMARY OF THE INVENTION

The present invention overcomes some of the disadvantages of the prior art, in that it is relatively simple, substantially automatic in operation, and is very versatile because it may be easily designed by the artisan to sense or probe exceedingly large gradient increases—relative to terrain distance traveled—without being stopped or stalled thereat.

Very briefly, a bell crank (or crankshaft, as the case may be) is driven by an electric motor, and as it is so driven, by means of connecting rods it moves multiple probes up and down, in and out of contact with the terrain or other surface. This is done at a relatively fast rate, say, for example, at a rate equal to or exceeding the natural frequency of carrier vehicle wheels, if any. It should perhaps be emphasized at this time that the aforesaid up and down movement of the aforesaid probes, prevents obstacles from interfering with the forward travel thereof, inasmuch as the probes timely step over them. This feature, of course, is one of the key features of the invention that not only makes it different from any known prior art, but makes the operation thereof and the results produced thereby a vast improvement thereover.

As that part of the invention which actually comes into contact with the terrain surface—herewith defined as being the terrain or surface sensing sampler—intermittently makes contact therewith, a shaft slides up into the frame thereof against the urging of a spring, thereby permitting the adjustment of a potentiometer in such manner as to produce a substantially squarewave type output voltage that is proportional to the position thereof relative to some predetermined reference datum—say, a horizontal plane.

Therefore, an object of this invention is to provide an improved terrain probe.

Another object of this invention is to provide an improved method and means for obtaining elevational data from a varying terrain, model board, or other irregular surface.

Another object of this invention is to provide an improved method and means for measuring, within reasonable limits, the smoothness of a surface.

A further object of this invention is to provide a terrain measuring probe which steps forward and, therefore, does not have its forward motion stopped by steep sloping obstacles or terrain in its path.

Another object of this invention is to provide an improved method and means for measuring elevations of a predetermined surface that are not adversely affected by the abrasiveness attitude or contour thereof.

Still another object of this invention is to provide a stepping terrain probe, the stepping of which may be varied in such manner as to be synchronized with the natural frequency of the wheels of the carrier vehicle thereof.

Another object of this invention is to provide a terrain measuring probe that will step upon or over, as the case may be, an elevational change that is normal to direction of movement thereof along the terrain or other surface being measured.

Another object of this invention is to provide an improved surface roughness measuring instrument that is easily and economically constructed, maintained, and used, regardless of the type of surface roughness which is being measured thereby.

Other objects and many of the attendant advantages of this invention will be readily appreciated as the same becomes better understood by reference to the following detailed description, when considered in connection with the accompanying drawings wherein:

BRIEF DESCRIPTION OF THE DRAWING

FIG. 1 depicts a block diagram of the system comprising the subject invention;

FIG. 2 illustrates a representative embodiment of the motor, bell crank, connecting rod, and surface sensing sampler arrangement that may be incorporated in the system of FIG. 1;

FIG. 3 discloses a preferred embodiment of a connecting rod assembly and surface sensing sampler that may be used as like components in the systems of FIGS. 1 and 2;

FIG. 6 illustrates in graphic form the output voltages ($E_o$) that may occur at the output of the potentiometers of FIGS. 1 and 3.

DESCRIPTION OF THE PREFERRED EMBODIMENT

Figure 4:
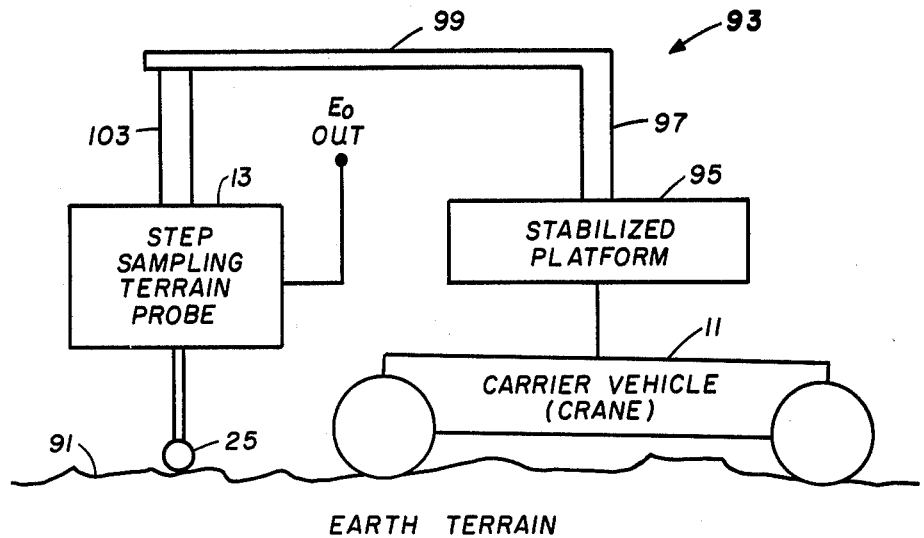
FIG. 4 discloses the instant invention as measuring the irregularities of the earth's surface.

At the outset, it would perhaps be noteworthy that the subject invention will be discussed predominantly herein as being operative to measure irregularities of—or smoothness of, as the case may be—either the surface of the earth or the surface of some predetermined model board (which perhaps may represent some particular surface of the earth). However, it should be understood at this time that, even though all of the other types of surfaces that are presently in existence are not discussed, they are intended to be included without limitation as possible surfaces whose irregularities, elevational changes, anomalies, or the like, could be probed and measured by the instant invention, regardless of whether the elevational changes or transitions thereof are abrupt or not.

For the purpose of simplicity of disclosure, insofar as practical, like parts of all Figures of the drawing will be indicated by like reference numerals.

Referring now to FIGS. 1 and 2, there is shown any suitable carrier vehicle 11 which acts as a transport for step terrain probe 13, the latter of which comprises a motor 15 having a bell crank 17 (or other appropriate rotatable crankshaft) connected between the rotatable shaft thereof and a bearing 19. Of course, said motor 15 and bearing 19 are both mounted on said carrier vehicle 11 in such manner as to be supported thereby.

Effectively connected to bell crank 17 is one or more terrain or surface sensing samplers 19 (five of which are shown in FIG. 2), which are preferably connected thereto by means of a like number of connecting rod assemblies 21 (which will be discussed more fully in conjunction with FIG. 3).

Terrain sensing samplers 19 timely touch the surface of terrain 23, the irregularities of which are being measured, by any suitable contact 25, which will be more specifically defined below.

The mechanical output of terrain sensing sampler 19 is connected to the slidable voltage pick-off arm (likewise to be discussed later) of a potentiometer 27 for the movement thereof therewith, and the electrical output effected thereby (in terms of $E_o$ 29) is connected to one of the inputs of a comparator 31. The other input of comparator 31 is connected to an adjustable reference potential 33, and the output thereof is connected to the input of any suitable voltage sample and hold device 35, such as, for instance, that manufactured by Burr-Brown Research Corporation of Tuscon, Ariz., and shown at pages 349 through 353 in their book entitled Operational Amplifiers, published by McGraw-Hill Book Company, New York, N.Y.

In the alternative, if so desired, a voltage peak detector similar to one or more of those disclosed at pages 353 through 358 of the aforementioned Burr-Brown book may be substituted for the aforesaid voltage sample and hold device 35.

The output of voltage sample and hold or peak detector device 35 is optionally connected to the input of an integrator 37, the latter of which should preferably have a suitable short time constant, so as to provide some smoothing but still essentially follow the output voltage variations from said voltage sample and hold or peak detector device 35 in an optimum manner. The output of integrator 37 is connected to the input of any appropriate, conventional readout 39. Of course, in the event that the incorporation of integrator 37 is not desired, readout 39 would then be directly connected to the output of the aforesaid voltage sample and hold or peak detector device 35; and, furthermore, if so desired, readout 39 may have any other utilization apparatus (not shown) substituted therefor. But, if both readout 39 and integrator 37 are employed, readout 39 may, of course, be any indicator, recorder, or the like, that is compatible with the output of said integrator 37.

In this particular instance, carrier vehicle 11 has any plurality of wheels 41 and 43, etc., in whatever number is necessary to maintain the stability thereof, as it travels along the terrain or surface to be measured. Of course, said wheels 41 and 43 could be runners, too; or, if desired, they could be combined with caterpillar tracks, as well, as will be discussed more fully subsequently. In any event, wheels 41 and 43 (or whatever) are preferably attached to carrier vehicle 11 via a like number of automatic levelers 45, 47, etc., respectively.

The aforementioned motor 15 has an adjustable speed control 49 connected thereto, so that, if desired, the rotational speed thereof—and, hence, the rotational speed of bell crank 17—may be adjusted to be synchronized with the natural frequency of the aforesaid wheels 41 and 43 or any other member or component combined with carrier vehicle 11, as it travels along the path whose surface is being measured.

An optional connector 51 is disclosed herewith as being any suitable means of attaching carrier vehicle 11 to any other utilization apparatus (not shown). For example, by means of said connector 51, carrier vehicle 11 might be connected to any compatible tractor vehicle, trailer vehicle, crane, gantry, ship, auto, aircraft, submarine, or the like. Thus, carrier vehicle 11 may or may not contain its own motive powerplant.

FIG. 3 discloses a preferred embodiment of surface sensing sampler 19 and connecting rod assembly 21 incorporated in the subject invention. As may be seen therein, connecting rod assembly 21 includes a split bearing 53, which is that part which is attached to rotatable bell crank 17 in the conventional manner; and connected to bearing 53 is one extremity of a connecting rod 55, the other extremity of which is rigidly connected to a wrist pin type cam 57 that rides within a slot 58—the length of which should at least be equal to the throw of the aforesaid bell crank 17—of a cross-arm type cam follower 59, the latter of which is rigidly connected to another shaft 60. Said shaft 60 extends through and rides up and down in a guide hole 61 of a guide plate 62 which is effectively attached to the frame of the aforesaid carrier vehicle 11. Shaft 60 is connected to a cylinder 63, within which a piston 64 slides against the urging of a coil spring 65 effectively disposed between connecting rod 60 and piston 64. A shaft or other extension 67 is connected to the extremity of piston 64 that is opposite connecting rod 60, and a terrain or surface contact sensor, such as, for instance, wheel 69, is connected thereto by another shaft 71 or any other conventional means.

As shown in FIG. 3, wheel 69 is disposed in line with the longitudinal axis of movable shaft 67; however, if desired, it may be connected thereto by means of a caster or the like, if so doing would facilitate the changing of travel direction thereof, as it rolls along its intended path on terrain or surface 23. Moreover, wheel 69 may be replaced by any other suitable contact or probe, such as, for example, a ball, a point, a runner, a flexible foot, or the like, as long as it accurately senses the elevation of the surface being measured as it steps therealong. Obviously, it would be well within the purview of the artisan having the benefit of the teachings presented herein to select whatever contact or probe 25 (as best seen in FIGS. 1 and 2) or 69 (as best seen in FIG. 3) as would expedite the movement and sensing operation thereof for practically any or all surfaces being sensed and sampled thereby.

A pair of limiting stops 73 and 75 are connected to piston 64 in such manner as to limit the sliding thereof within cylinder 61. If so doing would facilitate the mounting and operation of terrain sensing sampler 19, shaft 67 may extend through a guide hole 77 or the like of an appropriate portion 79 of the frame of the aforesaid carrier vehicle 11.

The aforementioned potentiometer 27 is best seen in FIG. 3 as having a resistance element 81, with a positive direct current voltage 83 connected to one end thereof and a ground 85 connected to the other end thereof. Of course, the aforementioned slidable arm thereof—herewith referenced as slidable arm 87—is physically (but not electrically) attached to the aforesaid shaft 67 for movement therewith; however, the aforesaid resistance portion 81 thereof is physically attached in any preferred effective manner to the frame of carrier vehicle 11 or other reference location. Said movable arm 87 is effectively electrically insulated from the terrain sensing sampler 19 and the aforesaid shaft 67; but because it is moved in correspondence with shaft 67—which, in turn, moves up and down with the variations of terrain 23 as a result of wheel 69 intermittently and timely coming into contact therewith—output voltage $E_o$ is picked off therefrom that represents the elevation of the terrain or surface being measured at some particular sampled point thereon with respect to a predetermined reference voltage.

FIG. 4 schematically depicts one representative embodiment of the invention being used as a method and means for sampling the elevational irregularities of an earth's terrain 91. As may readily be seen, a crane 93 has mounted on the carrier vehicle 11 thereof a conventional stabilized platform 95, which, in this particular instance, is shown as preferably being stabilized in the horizontal plane. And mounted thereon is a mast or other support tower structure 97, to which a boom 99 is attached which extends a predetermined distance from the carrier vehicle 11 portion thereof. Suspended in a rigid manner from boom 99 is a substantially vertical beam 103, from which step sampling terrain probe 13 is attached in such manner that the surface sensing sampler 25 thereof may intermittently touch the surface of earth 91, as it steps therealong, as crane 93 travels along its predetermined path.

Figure 5:
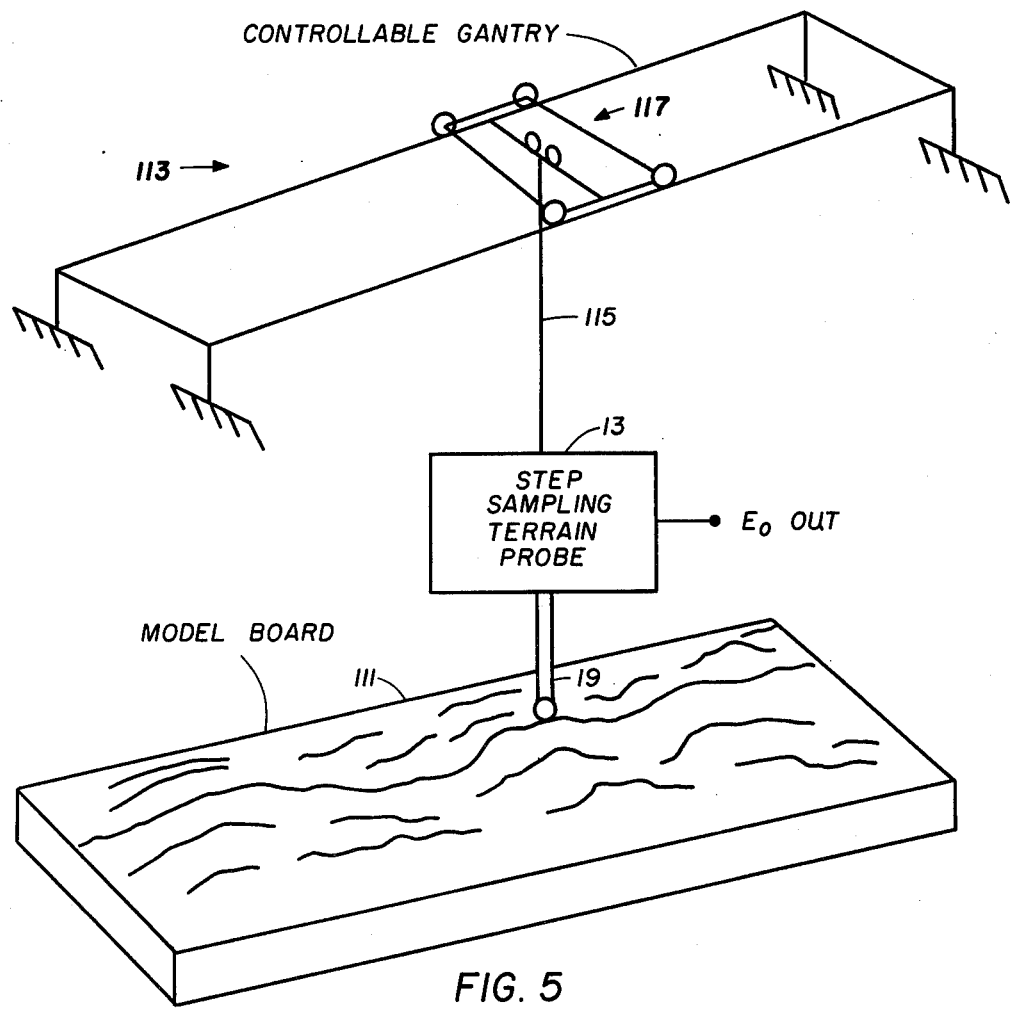
FIG. 5 discloses the instant invention as measuring the surface irregularities of a model board.

FIG. 5 very simply and schematically illustrates another representative embodiment of the invention as being used as a method and means for sampling the elevational irregularities of the surface of a model board 111. In this case, a conventional controllable gantry system 113 is employed to support step sampling terrain probe 13 by a rigid rod or flexible cable 115, or any other suitable connection means, in such manner that surface sensing sampler 19 thereof will intermittently contact the surface of the aforesaid model board 111, as it steps therealong, due to the movement of gantry trolley 117.

FIG. 6(A) discloses a typical voltage $E_o$ that occurs at the output of each of any given number of sampling probes at any given time and a terrain profile that may be drawn to correlate therewith. For example, if squarewave $E_o$ voltages I through V have respectively occurred as a result of the simultaneous terrain sampling by the aforementioned samplers I through V of FIG. 2, as they travel, say, into—that is, perpendicular to—the drawing sheet, the cross-sectional terrain profile of FIG. 6(B) may be constructed by smoothly interconnecting the plots thereof. Of course, said $E_o$ voltages also occur in the directions normal thereto as a result of the respective stepping operations of samplers 19 and, thus, produce analog voltages representing the gradient profiles in that direction, too, as they travel along their predetermined sampling paths, as will be mentioned again during the discussion of the operation of the invention presented below.

MODE OF OPERATION

The operation of the invention will now be discussed briefly in conjunction with all of the figures of the drawing.

Referring first to the generalized disclosure of the invention portrayed in FIG. 1, it may readily be seen that as step sampling terrain probe 13 is moved along a given path by carrier vehicle 11—or by crane 93 of FIG. 4 or controllable gantry 113 of FIG. 5—motor 15 drives bell crank 17 in such manner as to rotate it at whatever speed is set on adjustable speed control 49.

As previously suggested, the shaft speed of motor 15 may be adjusted by speed control 49, so as to make surface sensing sampler 19 step as rapidly or as slowly up and down as will optimize the operation of the invention for any given surface being measured.

As bell crank 17 rotates, surface sensing sampler 19 is moved up and down with a substantially vertical motion; and as vehicle 11 moves forward at some speed predetermined by the operator, surface sensing sampler 19 effectively steps along the aforesaid given path, intermittently touching the surface thereof.

Perhaps it would be noteworthy at this time that the aforementioned bell crank rotation, which causes the vertical stepping of the surface sensing sampler, is one of the major keys of this invention which causes it to constitute a considerable advancement in the art. Its operation in conjunction with surface sensing sampler 19 permits sensing sampler 19 to step upon or step over an elevational change in terrain surface that is perpendicular to the trend thereof at any given place thereon. Hence, extreme terrain slopes or other obstacles do not stop the forward motion of the invention, as it travels forward along its intended path. Accordingly, the subject invention is not limited to measuring surfaces having small gradients. Of course, the height of the steps that may be taken by the surface sensing sampler (or samplers, as the case may be) will depend on the "throw" of the crank (or cranks, respectively) of the bell crank or crankshaft to which it is connected, with the "throw" thereof being selectable by the artisan, without his violating the scope of this invention.

Undoubtedly, at this point, the artisan could also design other methods and means for moving surface sensing sampler 19 up and down in a timely and otherwise proper manner. For example, bell crank 17 could include suitably configured rotatable cams which engage with suitably configured cam followers that are effectively connected to said surface sensing sampler 19. Thus, the following of said cam by said cam follower would move sampler 19 up and down in accordance with the contour of the cam and the speed of rotation thereof.

Of course, as disclosed in FIG. 2, a plurality of surface sensing samplers 19 may be moved along as mentioned above. Although only five thereof are depicted in FIG. 2, it should be understood that any number thereof may be used for measuring the irregularities of a terrain (or other surface) along as wide a path as is desired or as is practical during any given operational circumstances. Obviously, it would be well within the purview of the artisan having the benefit of the teachings presented herein to select whatever number surface sensing samplers 19 as would optimize such terrain surface measuring.

As best seen in FIG. 3, each surface sensing sampler 20 functions internally in the following manner:

At some place in its downward motion, wheel 69 (or other probe, as the case may be) makes contact with terrain surface 23, at which time the downward motion thereof and piston 64, to which it is effectively attached, effectively stop. However, due to the continuing revolving of bell crank 17, cylinder 63 continues its downward motion in opposition to the urging of coil spring 65 as a result of the force applied thereto via bearing 53, rod 55, pin 57, the lower surface of slot 58 of cross-arm 59, and rod 60. Of course, since said coil spring 65 acts in compression, it tends to resiliently urge cylinder 63 and piston 64 in opposite directions, thereby causing them to be maintained in as diametrically opposed positions as permitted by operational circumstances at all times, while still allowing considerable flexibility of movement therebetween within certain limits defined by stops 73 and 75.

Once bell crank 17 reaches its bottom dead center, cylinder 63 stops its downward movement relative to said piston 64. Because the position of wheel 69 and shaft 67—when stopped due to wheel 69 contacting surface 23—determine the lowest position of movable arm 87 with respect to resistance 81 of potentiometer 27, a voltage $E_o$ is picked-off therefrom which is proportional to the distance between terrain surface 23 and the frame of carrier vehicle 11. And since said carrier vehicle is effectively held at a level and substantially uniform position with respect to terrain 23 by automatic levelers 45, 47, etc., the frame of carrier vehicle 11 effectively becomes a reference datum therefor. Thus, it may readily be seen that for each stepping operation of surface sensing sampler 19, voltage $E_o$—as typically represented in FIG. 6(A)—represents the elevation of terrain 23 at some contact location for all practical purposes, relative to a predetermined hypothetical datum plane, in turn represented by the presetting of reference potential 33. Of course, when voltage $E_o$ is compared with said preset reference potential 33 in comparator 31, an analog voltage representing the difference therebetween is produced, and once that difference voltage is sampled and held by voltage sample and hold or peak detector 35 and optionally integrated by integrator 37, an analog voltage truly representative of terrain elevation is obtained. Each of points I through V of FIG. 6(B) corresponds to such terrain elevations along a path of some certain width equal to the distance between points I and V, as the subject invention travels, say, normal to the drawing sheet on which they are presented. And, of course, the connection thereof with a line closely approximates a cross-sectional profile of terrain surface 23.

Readout 39 reads out the aforementioned smoothed consecutive $E_o$ step voltages along a line in the direction of travel of carrier vehicle 11, and in the event a plurality of terrain probes 13 are used, readout 39 may be employed for reading out all of the respective consecutive $E_o$ elevational voltages therefrom, either individually or in concert.

As illustrated in schematic form in FIGS. 4 and 5, the subject invention may be used to measure actual terrain elevations or surface elevations on a model board—which, in fact, may correspond to some actual location on the surface of the earth. In the former instance, crane 93 and stabilized platform 95 are used to support step sampling terrain 13, while in the latter, a controllable gantry rigidly mounted at some predetermined attitude with respect to model board 111 is employed. Hence, it may be readily seen that the subject invention has many applications, only a few of which have been described herein.

Obviously, many modifications and variations of the present invention are possible in the light of the above teachings. It is, therefore, to be understood that within the scope of the appended claims the invention may be practiced otherwise than as specifically described.

What is claimed is:

1. A surface elevation measuring system, comprising in combination:

a rotatable bell crank;

means connected to said bell crank for the rotational driving thereof at a preset speed;

means having a frame effectively connected to said rotatable bell crank and the aforesaid bell crank driving means for the supporting thereof, said means being adapted for traversing predetermined paths along a surface whose elevation is being measured;

a surface sensing sampler effectively connected to said rotatable bell crank, said surface sensing sampler being adapted for reciprocating in a substantially linear manner along a predetermined axis in response to the rotation of said bell crank;

a connecting rod assembly connected between the aforesaid rotatable bell crank and said surface sensing sampler;

means disposed in the frame of the aforesaid supporting means and in contiguous disposition with said surface sensing sampler for effectively guiding said surface sensing sampler in a linear manner along said predetermined axis, as the aforesaid bell crank rotates; and means effectively connected between the frame of said supporting means and said surface sensing sampler for producing a voltage signal that is proportional to the relative dispositions thereof.

2. The device of claim 1, wherein the surface whose elevation is being measured comprises a predetermined earth's surface.

3. The device of claim 1, wherein the surface whose elevation is being measured comprises a predetermined model board surface.

4. The device of claim 1, wherein said rotatable bell crank comprises a crankshaft having a crank throw that is greater than the maximum surface elevational difference to be measured.

5. The device of claim 1, wherein said means having a frame effectively connected to said rotatable bell crank and the aforesaid bell crank driving means for the supporting thereof comprises a carrier vehicle.

6. The device of claim 1, wherein said means having a frame effectively connected to said rotatable bell crank and the aforesaid bell crank driving means for the supporting thereof comprises:
 a carrier vehicle; and
 a stabilized platform connected between said carrier vehicle and the aforesaid rotatable bell crank and driving means.

7. The device of claim 1, wherein said means having a frame effectively connected to said rotatable bell crank and the aforesaid bell crank driving means for the supporting thereof comprises a crane.

8. The device of claim 1, wherein said means having a frame effectively connected to said rotatable bell crank and the aforesaid bell crank driving means for the supporting thereof comprises a gantry.

9. The device of claim 1, wherein said means disposed in the frame of the aforesaid supporting means and in contiguous disposition with said surface sensing sampler for effectively guiding said surface sensing sampler in a linear manner along said predetermined axis, as the aforesaid bell crank rotates, comprises a pair of guide holes respectively disposed adjacent to but spatially disposed from the extremities of said surface sensing sampler.

10. The device of claim 1, wherein said means effectively connected between the frame of said supporting means and said surface sensing sampler for producing a voltage signal that is proportional to the relative dispositions thereof comprises:
 a potentiometer having a fixed resistance portion and a movable arm slidable thereagainst, with the fixed resistance portion thereof effectively connected to the frame of said supporting means, and with the movable arm thereof effectively connected to the aforesaid surface sensing sampler;
 a positive direct current voltage connected to one terminal of the fixed resistance portion of said potentiometer; and
 a ground connected to the other terminal of the fixed resistance portion of said potentiometer.

11. The invention of claim 1, further characterized by means effectively connected to said supporting means for effecting the leveling thereof in a substantially horizontal plane.

12. The invention of claim 1, further characterized by:
 an adjustable reference potential source; and
 a comparator having a pair of inputs and an output, with one of the inputs thereof connected to the output of said adjustable reference potential source, and with the other input thereof connected to the output of the aforesaid voltage signal producing means.

13. The invention of claim 1, further characterized by:
 an adjustable reference potential source;
 a comparator having a pair of inputs and an output, with one of the inputs thereof connected to the output of said adjustable reference potential source, and with the other input thereof connected to the output of the aforesaid voltage signal producing means; and
 a readout effectively connected to the output of said comparator.

14. The invention of claim 1, further characterized by:
 an adjustable reference potential source;
 a comparator having a pair of inputs and an output, with one of the inputs thereof connected to the output of said adjustable reference potential source, and with the other input thereof connected to the output of the aforesaid voltage signal producing means;
 a voltage sample and hold device connected to the output of said comparator; and
 a readout connected to the output of said voltage sample and hold device.

15. The invention of claim 1, further characterized by:
 an adjustable reference potential source;
 a comparator having a pair of inputs and an output, with one of the inputs thereof connected to the output of said adjustable reference potential source, and with the other input thereof connected to the output of the aforesaid voltage signal producing means;
 a voltage sample and hold device connected to the output of said comparator;
 an integrator connected to the output of said voltage sample and hold device; and
 a readout connected to the output of said integrator.

16. The device of claim 1, wherein said connecting rod assembly comprises:
 a bearing effectively connected to the crank of said rotatable bell crank;
 a first shaft connected to said bearing;
 a wrist pin cam connected to the extremity of said first shaft that is opposite the aforesaid bearing;
 a cross-arm cam follower having a predetermined slot therein, with the peripheral surface of said slot being in slidable engagement with the aforesaid wrist pin cam; and
 a second shaft connected between said cross-arm cam follower and one extremity of said surface sensing sampler.

17. The device of claim 1, wherein said surface sensing sampler effectively connected to said rotatable bell crank comprises:
 a cylinder connected to one end of said connecting rod assembly;
 a piston disposed within said cylinder for slidable engagement therewith;
 a compression spring disposed within said cylinder in effective interconnection with one end thereof and one end of the aforesaid piston;
 a shaft connected to the end of said piston that is opposite the end thereof to which said compression spring is connected; and
 means connected to the end of said shaft that is opposite the end thereof to which said piston is connected for timely contacting the surface whose elevations are being measured.

18. The device of claim 17, wherein said means connected to the end of said shaft that is opposite the end thereof to which said piston is connected for timely contacting the surface whose elevations are being measured comprises a wheel.

19. The device of claim 17, wherein said means connected to the end of said shaft that is opposite the end thereof to which said piston is connected for timely contacting the surface whose elevations are being measured comprises a foot.

20. The device of claim 17, wherein said means connected to the end of said shaft that is opposite the end thereof to which said piston is connected for timely contacting the surface whose elevations are being measured comprises a probe.

21. The device of claim 17, wherein said means connected to the end of said shaft that is opposite the end thereof to which said piston is connected for timely contacting the surface whose elevations are being measured comprises a ball point.

22. The invention of claim 21, further characterized by a pair of stops connected to said shaft in such manner as to limit the travel of the aforesaid piston in said cylinder.

23. A surface contour measuring system, comprising in combination:
   a motor speed control;
   a drive motor connected to the output of said motor speed control;
   a bell crank connected to the shaft output of said drive motor;
   a surface sensing sampler connected to said bell crank;
   a potentiometer having a fixed resistance and a movable arm in slidable engagement therewith, with the movable arm thereof effectively connected to said surface sensing sampler;
   a positive direct current voltage connected to one terminal of the fixed resistance of said potentiometer;
   a ground connected to the other terminal of the fixed resistance of said potentiometer;
   an adjustable reference potential source;
   a comparator having a pair of inputs and an output, with the inputs thereof respectively connected to the outputs of said adjustable reference potential source and the aforesaid potentiometer;
   a peak voltage detector connected to the output of said comparator; and
   a readout effectively connected to the output of said peak voltage detector.

24. The invention of claim 23, further characterized by an integrator connected between the output of said peak voltage detector and the input of the aforesaid readout.

25. The invention of claim 23, further characterized by means effectively connected to the aforesaid motor speed control, drive motor, bell crank, surface sensing sampler, potentiometer, adjustable reference potential source, comparator, peak voltage detector, integrator, and readout for the movement thereof along a predetermined path on the surface whose contour is to be measured.

* * * * *